US005278079A

United States Patent [19]

Gubinski et al.

[11] Patent Number: 5,278,079

[45] Date of Patent: Jan. 11, 1994

[54] SEALING DEVICE AND METHOD FOR INHIBITION OF FLOW IN CAPILLARY MEASURING DEVICES

[75] Inventors: Julian Gubinski, Jamison; John L. Palmer, Philadelphia, both of Pa.

[73] Assignee: Enzymatics, Inc., Horsham, Pa.

[21] Appl. No.: 939,707

[22] Filed: Sep. 2, 1992

[51] Int. Cl.[5] ........................ G01N 31/22; B01L 11/00

[52] U.S. Cl. .................................. 436/165; 73/864.02; 422/56; 422/57; 422/58; 422/100; 436/180

[58] Field of Search ................... 422/57, 58, 100, 102, 422/56; 73/864.02; 436/165, 180

[56] References Cited

U.S. PATENT DOCUMENTS

| | | | |
|---|---|---|---|
| 4,336,091 | 6/1982 | Gottermeier | 156/244.12 |
| 4,413,407 | 11/1983 | Columbus | 29/825 |
| 4,437,970 | 3/1984 | Kitajima et al. | 204/412 |
| 4,468,271 | 8/1984 | Pierson | 156/220 |
| 4,549,952 | 10/1985 | Columbus | 422/100 X |
| 4,556,474 | 12/1985 | Pierson | 204/416 |
| 4,761,381 | 2/1988 | Blatt et al. | 422/57 X |
| 4,855,240 | 8/1989 | Rosenstein et al. | 436/514 |
| 5,032,506 | 7/1991 | Palmer et al. | 435/26 |
| 5,036,000 | 7/1991 | Palmer et al. | 435/26 |
| 5,065,768 | 11/1991 | Coleman et al. | 73/864.02 |
| 5,087,556 | 2/1992 | Ertinghausen | 435/7.9 |
| 5,126,247 | 6/1992 | Palmer et al. | 435/25 |

FOREIGN PATENT DOCUMENTS 0010456 4/1980 European Pat. Off. .

*Primary Examiner*—Jill A. Johnston
*Attorney, Agent, or Firm*—Finnegan, Henderson, Farabow, Garrett & Dunner

[57] ABSTRACT

A channel or chamber device having means for inhibiting flow of aqueous medium therein after the channel or chamber has been filled with aqueous medium. The device has a channel or chamber with a sample intake port at one end and an exhaust port at the other end. A restricted or reduced size chamber portion having reduced dimension (height, cross-sectional area or diameter) toward the exhaust port is provided with a water-expandable polymer in the restricted or reduced size chamber portion. The water-expandable polymer inhibits flow or forms a seal in the exhaust port when the polymer is contacted with an aqueous medium. The channel or chamber device having means for inhibiting flow of aqueous medium therein is especially adaptable to capillaries used in medical diagnostic measuring devices which contain an analytical reagent for biological fluids, such as saliva and plasma.

33 Claims, 2 Drawing Sheets

SEALING DEVICE AND METHOD FOR INHIBITION OF FLOW IN CAPILLARY MEASURING DEVICES

BACKGROUND OF THE INVENTION

The present invention relates generally to capillary measuring and detecting devices, and more particularly, to a sealing device and method for the inhibition of liquid flow in capillary measuring devices, especially in capillary based diagnostic measuring devices.

Typically, the devices of the present invention have a chamber, e g., a capillary chamber or channel, which fills with a liquid by capillary and/or other action, and the liquid is metered into all parts of the device. In one such class of capillary devices, once the capillary chamber or capillary channel is filled with liquid, it is very important to inhibit or prevent further movement of the liquid. Any such movement of liquid can potentially disturb any analytical reading for which the device is used.

Capillary measuring devices are well-known and have wide utility in the field of analytical diagnosis. Capillary measuring devices are described in U.S. Pat. Nos. 5,032,506 and 5,036,000, both of which are incorporated by reference herein in their entirety. These patents describe a capillary measurement system based on a dehydrogenase based analog-to-digital switch suitable for the measurement of numerous metabolic substances, which is particularly adaptable to the measurement of alcohol from a saliva sample. A product based on this technology is commercially available from Enzymatics, Incorporated and is identified as the Q.E.D. Saliva Alcohol Test.

In U.S. Pat. No. 5,126,247 filed Feb. 26, 1988, now allowed, which is incorporated by reference herein in its entirety, there is described a method, system and device for the assay and detection of biochemical molecules. Disclosed and described therein is a capillary measuring device based on oxidation of a substrate by an enzyme capable of transferring electrons to an aromatic or anti-aromatic acceptor, which is particularly adaptable to measurement of cholesterol from a fingerstick drop of blood.

In the above-identified patents and patent application, there is a threshold gradient maintained along the capillary The capillary is filled with analytical sample without disturbing the gradient. After filling the capillary, the reagents that produce the gradient dissolve into the liquid sample and are present in a gradient along the length of the capillary. This gradient would be disturbed if the liquid stream was capable of additional movement, for example, by capillary action, and any movement of the gradient stream could result in error in the analysis determined in the analytical device. In view of the foregoing, it can be seen that it would be highly desirable to prevent such movement of the liquid in the capillary device.

In U.S Pat. No. 5,087,556, which is incorporated by reference herein in its entirety, a method is described for the quantitative analysis of body fluid constituents by a self-contained, chromatic quantitative analyzer that quantitatively detects an analyte in a biological fluid. This patent describes a base having a first open reservoir for receiving biological fluid; a means for separating solids from the biological fluid in the first open reservoir; a channel for drawing by capillary and/or wicking action, the biological fluid from the first open reservoir to a second open reservoir, wherein the second open reservoir draws the biological fluid from the channel, and, when the second open reservoir is full of biological fluid, the capillary and/or wicking action terminates. The means for metering the biological fluid is complex, and a "pull" compartment or a second open reservoir filled with an absorbent is used as the means for metering the biological fluid. The geometry, physical nature and method of incorporation of the "pull" compartment and the channel must be configured to precisely meter the volume and rate of flow of the biological fluid through the channel. Thus, this device utilizes a complex arrangement and system for precise metering.

In view of the foregoing, it can be seen that simplified metering and control systems are desirable for inhibiting or controlling the flow of liquids, for example, biological fluids, in capillary measuring devices.

SUMMARY OF THE INVENTION

In accordance with the present invention, there is provided a sealable device and sealing method for the inhibition of the flow of liquids in a chamber of measuring devices once the chamber has been filled with the liquid. Basically, the device has a port which is initially opened and which allows air, gas and/or fluid to escape from the device as the device fills with liquid. Once the liquid in the device reaches the port, a sealing device in the port closes and seals the device to produce a closed or substantially closed device, thereby preventing the escape of air, gas and/or fluid and inhibiting any further flow of the liquid in the device.

In accordance with the present invention, there is provided a sealable chamber device comprising a hollow chamber having a sample intake port at a first end and an exhaust port at a second end, said hollow chamber having a first chamber portion extending from said intake port and terminating in a reduced chamber portion having a cross-sectional area less than said first chamber portion proximal said exhaust port and a sufficient amount of expandable polymer in said reduced chamber portion which forms a seal in said reduced chamber portion upon contact of the polymer with an aqueous medium.

In accordance with the present invention, there is also provided a flow measuring device comprising a first chamber having a sample intake port at one end and a second chamber of reduced cross-sectional area contiguous with and at the other end of said first chamber, said second chamber having an exhaust port contiguous with said second chamber and disposed opposite said sample intake port; an analytical reagent for medical diagnostics disposed in said first chamber; a water expandable polymer sealing means disposed in said second chamber; means for passing an aqueous medium from said sample intake port through said first chamber to said second chamber; and means for contacting the water-expandable polymer sealing means with an aqueous medium, thereby causing the polymer to expand and form a seal in said second chamber.

In certain embodiments of the present invention, there is provided a sealable device comprising a tube, chamber, capillary or channel having a sample intake port at a first end and an air exhaust port at a second end, said tube, chamber, capillary or channel having a first tube, chamber, capillary or channel portion extending from said intake port and terminating in a restricted of reduced chamber portion of reduced dimension, i.e., having a cross-sectional area less than the cross-sectional area of said first tube, chamber, capillary or channel portion, at and/or proximal said air exhaust port. A sufficient amount of water-expandable polymer is provided in said restricted or reduced chamber portion of said tube, chamber, capillary or channel portion to form a seal in said air exhaust port upon contact of the polymer with an aqueous medium.

There is also defined herein a capillary flow measuring device comprising a first capillary chamber having a sample intake port at one end and a second capillary chamber of reduced cross-sectional area contiguous with and at the other end of said first chamber, said second capillary chamber having an air exhaust port contiguous with said second capillary chamber and disposed opposite said sample intake port; an analytical reagent for medical diagnostics disposed in said first chamber; a water-expandable polymer sealing means in said second capillary chamber; means for passing an aqueous medium from said sample intake port through said first capillary chamber to said second capillary chamber, and means for contacting the water-expandable polymer sealing means with the aqueous medium, thereby causing the polymer to expand and form a seal in said second capillary chamber.

In certain embodiments of the present invention, the water-expandable polymer in said second capillary chamber of reduced cross-sectional area is on a polymer film and said polymer film extends substantially from the sample intake port to the air exhaust port, and/or a medical diagnostic or other reagent is coated on a portion of polymer film substantially in the region of the first capillary chamber.

It is also within the scope of the present invention to provide a method for inhibiting the flow of an aqueous medium in a tube, chamber, capillary or channel having a sample intake port at one end and an exhaust port at or proximal the other end, by providing a tube, chamber, capillary or channel having a reduced size in the tube, chamber, capillary or channel at or proximal the exhaust port end and adding a sufficient amount of water-expandable polymer to that portion of the tube, chamber, capillary or channel having a reduced size, to form a seal and/or inhibit flow through said exhaust port upon contact of the polymer with an aqueous medium. In accordance with the present invention, there is also provided a method for inhibiting the flow of an aqueous medium in a tube, chamber, capillary or channel which further encompasses passing an aqueous medium from said sample intake port to said exhaust port and contacting the polymer with the aqueous medium, thereby causing the polymer to expand and seal and/or inhibit flow through the exhaust port.

By providing a capillary with a restricted portion of reduced capillary dimension, i.e., of reduced cross-sectional area, in combination with a sufficient amount of water-expandable hydrophilic polymer in the restricted portion to form a seal in the restricted portion upon contact of the polymer with an aqueous medium, there has been provided a simplified and inexpensive method and device for self-sealing of a capillary once the capillary is filled with liquid, thereby inhibiting additional flow of liquid in the capillary.

As used herein, tube, chamber, channel and capillary are used interchangeably and are used to define any configuration which operates by the passage of a liquid medium therethrough, including, for example, capillary action, and which is adaptable to the formation of a restricted portion of reduced dimension, i.e., a reduction in cross-sectional area, which can be sealed by a water-expandable polymer in accordance with the present invention.

It is to be understood that both the foregoing general description and the following detailed description and accompanying drawings are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to certain present preferred embodiments of the invention, examples of which are illustrated in the accompanying drawings. Wherever possible, the same reference numbers will be used throughout the drawings to refer to the same or like parts.

Figure 2:
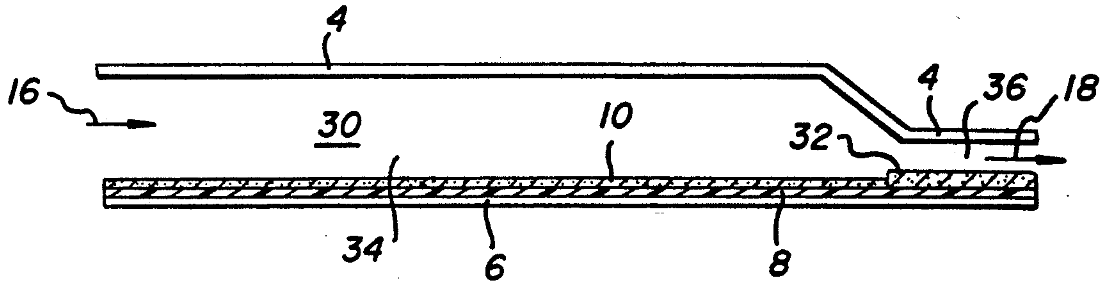
FIG. 2 is a cross-sectional, longitudinal view of a capillary sealing device according to certain embodiments of the present invention in the open configuration.
Figure 5:
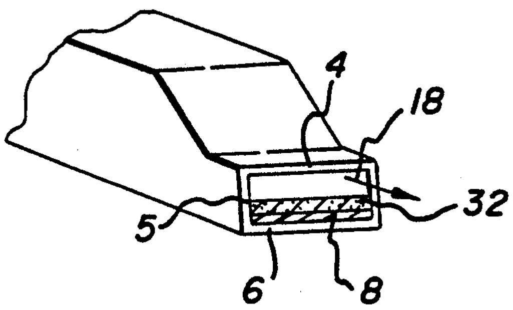
FIG. 5 is a cutaway perspective end view of the air exhaust port end of the capillary device illustrated in FIG. 2.

Referring to certain preferred embodiments, sealable capillary 30, illustrated in FIGS. 2 and 5, has capillary chamber 34 that has a sample intake port 16 at one end (a first end) and air exhaust port 18 at the other end (a second end). At air exhaust port end 18 of sealable capillary 30, there is provided restricted capillary portion 36 having a reduced capillary dimension, cross section or height, restricted chamber portion 36 being contiguous with capillary chamber 34.

The inhibited flow capillary measuring device 30 of FIG. 2 can also be defined as having a first capillary chamber 34 with sample intake port 16 at one end and second capillary chamber 36 of reduced dimension, cross section or height contiguous with and at the other end of first chamber 34. Second capillary chamber 36 has an air exhaust port 18 contiguous therewith and disposed substantially opposite sample intake port 16 such that prior to sealing of capillary 30, fluid enters capillary 30 at sample intake port 16 and air can exit capillary 30 at air exhaust port 18 as capillary 30 fills with fluid.

In accordance with the present invention, water-expandable hydrophilic polymer 32 is placed in restricted or second chamber portion 36 to provide means for sealing capillary 30 by preventing flow of air, gas or liquid out of air exhaust port 18 when water-expandable polymer 32 expands into and seals restricted or second chamber portion 36.

The particular type of water-expandable polymer is not critical in the practice of the present invention as long as the polymer is expandable when it is contacted with water from an aqueous-based medium. Furthermore, the water-expandable polymer must be one which is inactive or inert (non-reactive]with the aqueous medium, with any analytical reagent placed in first capillary chamber portion 34 and with the reaction products formed in first capillary chamber 34. One skilled in the art, without undue experimentation, can easily select a water-expandable polymer which can expand into restricted or second chamber portion 36 and seal capillary 30 by preventing the flow of air, gas and/or liquid from air exhaust port 18.

In preferred embodiments, the polymer is 100% hydrophilic and is susceptible to rapid hydration in the dry state when it is contacted with water. For example, all polymers which meet the foregoing criteria and which tend to take up (absorb with expansion) a larger volume of water than the volume of the dried polymer, may be used in the present invention. Many of the hydrophilic polymers found useful in the present invention tend to be charged polymers, however, cellulose, which is a hydrophilic expandable polymer, is an exception, that is, it is not a charged polymer. Examples of water-expandable hydrophilic polymer, according to certain embodiments of the present invention, include carboxymethyl cellulose, sodium alginate, gelatin, cellulose, a mixture of sodium alginate and gelatin, for example, a mixture of 50% by weight sodium alginate and 50% by weight gelatin, a mixture of cellulose and carboxymethyl cellulose, for example, a mixture of 50% by weight cellulose and 50% by weight carboxymethyl cellulose, and the like.

The amount of water-expandable hydrophilic polymer 32 disposed in restricted or second chamber portion 36 of capillary 30 is not critical as long as there is a sufficient amount of water-expandable hydrophilic polymer 32 to expand into and fill the cross section of at least a portion of the restricted or second chamber portion 36 when the polymer is contacted by water from an aqueous medium advancing through the capillary. The amount of polymer 32 placed in restricted or second chamber portion 36 will depend upon the size of the cavity or opening which must be filled with the polymer in order to seal the capillary at the restricted chamber portion. The amount of polymer can be determined by one skilled in the art, without undue experimentation, depending upon the expandable nature and characteristics of the particular polymer and the size of the restricted or second chamber portion which must be filled by the expanded polymer.

An example of at least one method for determining the amount of polymer to be used is as follows. The size of the portion of the restricted or second chamber portion to be filled with polymer can be measured. Water can be applied to a sample of water-expandable hydrophilic polymer supported on a substrate to determine if there is sufficient expansion of the polymer to expand into and fill the portion of a chamber having the size of the restricted or second chamber portion which was measured. For example, it has been determined that a layer of carboxymethyl cellulose deposited on a polyester film and having a thickness of less than about 0.001 inch on the film substrate will expand into and seal the cross section of a restricted or second chamber portion having a dimension in height of about 0.003–0.004 inch.

The layer or layers of water-expandable hydrophilic polymer supported on a substrate film may be deposited on a portion of the film sufficient in length to form a plug or seal in at least part of the restricted portion upon expansion of the polymer. For example, hydrophilic polymer extending lengthwise on the substrate film, the length of which polymer corresponds to the length of the restricted portion, may be used in certain preferred embodiments. According to certain preferred embodiments, it has been found that layer(s) of water-expandable hydrophilic polymer deposited in a strip on substrate film which form seals or plugs of about 0.08 inch to about 0.25 inch long may be used with the most preferred strip of water-expandable hydrophilic polymer forming a seal or plug about 0.16 inch long.

The capillaries represented in the drawings are represented as having an upper capillary wall 4 and a lower capillary wall 6. The material used for the capillary walls is not critical in the practice of the present invention, and the capillary walls may be made of any conventional material, for example, polymeric materials, glass and the like. The shape and size of the capillary is also not critical in the practice of the present invention, and capillaries having a circular, rectangular, square or any other cross-sectional configuration can be used in the practice of the present invention.

In embodiments wherein the capillary has a circular cross section, the circular portions of the capillary wall can be divided into top capillary wall and bottom capillary wall substantially as described herein and suitable restricted capillary chamber portions having reduced diameter or height can be made therein.

The sealing device and method of the present invention are easily adaptable to any shape or size of capillary device as long as the capillary device can be molded, softened or otherwise formed such that the capillary has a restricted second chamber portion of reduced capillary dimension or cross-sectional area at or toward (proximal) one end of the capillary. The restricted or second chamber portion can be easily formed when the capillary is molded from plastic or can be formed after plastic or glass are softened after the application of heat thereto. In certain preferred embodiments, the capillary has a rectangular configuration in height and width as shown in FIG. 5, for example. Such capillaries can be easily formed by fixing together two sections of material, for example, plastic, having a capillary channel therein.

The size of the capillary is not critical in the practice of the present invention and depends upon the particular use to which the capillary device is to be applied. Thus, the length and cross-sectional area, or width and height or diameter of the capillary are not critical in the practice of the present invention as long as the sizes are such that an aqueous medium can move therein by capillary or other action from sample intake 16 toward air exhaust port 18. The length, cross-sectional area or width and height (or diameter depending upon the configuration of the capillary) of the restricted or second chamber portion are not critical, as long as a sufficient amount of water-expandable hydrophilic polymer can be placed in the restricted or second chamber portion to form a seal therein in at least a portion of the cross section thereof upon contact of the polymer with an aqueous medium.

Figure 4:
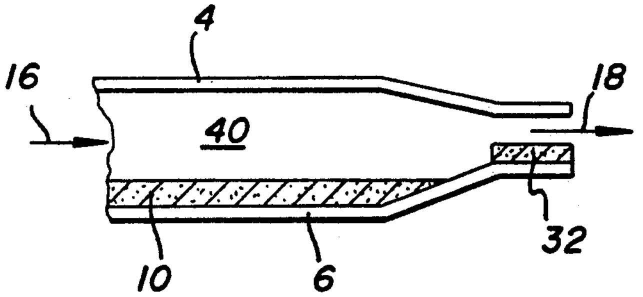
FIG. 4 is a cutaway, cross-sectional, longitudinal view of an alternative configuration of a capillary sealing device according to certain embodiments of the present invention.

The length of the restricted second chamber portion essentially has no upper limit, and any length greater than about 0.020 inch (about 0.05 cm.) can be used in the device and method herein. In certain preferred embodiments, the length (in the longitudinal direction) is about 0.035 to about 0.04 inch (about 0.09 to about 0.10 cm.). Furthermore, the particular configuration of the first and second chamber portions is not critical as long as capillary or other appropriate flow can be maintained prior to sealing, and as long as the water-expandable polymer can expand into and fill at least a portion of the cross section of the restricted or second portion, thereby preventing further flow of liquid medium, gas and/or air through air exhaust port 18. Two examples are shown in FIGS. 2 and 4.

In accordance with certain preferred embodiments of the present invention, the sealing or closure of the restricted or second chamber portion should be completed as soon as possible after the capillary has been filled with aqueous medium in order to inhibit flow of the aqueous medium in the capillary. Thus, in accordance with certain preferred embodiments of the present invention, there must be provided a sufficient amount of water-expandable polymer in the restricted or second chamber portion of reduced capillary dimension or cross-sectional area such that the restricted or second chamber portion is sealed as soon as possible after the capillary is filled with the aqueous medium, for example, according to certain preferred embodiments, in less than 25 seconds, and more preferably, in less than 10 seconds. In most instances, it has been determined that if the restricted or second chamber portion is sealed within about 10 to about 15 seconds after aqueous medium contacts the water-expandable hydrophilic polymer, flow of aqueous medium in the capillary will be inhibited to assist in the accuracy of the measurements made therein.

As used herein, "seal" includes complete or substantial blockage of the restricted chamber, tube, channel or capillary, i.e., it prevents or inhibits flow through the restricted portion of the chamber, tube, channel or capillary. According to certain preferred embodiments, the seal or plug blocks the restricted chamber, tube, channel or capillary and prevents or inhibits flow in the capillary for at least 30 minutes. In certain preferred embodiments, the strength of the plug or seal is such that a force of 5 p.s.i. will not move the sample in the chamber, tube, channel or capillary.

Although there is no intent for the present invention to be limited by the particular dimensions of the restricted or second chamber portion of the capillary, according to certain preferred embodiments, a reduced capillary dimension or cross-sectional area, for example, in height, of the restricted chamber portion is generally about 50% to about 95% less than the dimension or cross-section area, for example, in height, of the non-restricted first capillary chamber or the portion from the intake port to the restricted or second chamber portion (non-restricted chamber portion). According to certain more preferred embodiments, the reduced capillary dimension of the restricted or second chamber portion is about 67% to about 75% less than the dimension of the first capillary chamber. For example, when the nonrestricted capillary has a dimension of about 0.012 inch (in height or diameter above substrate film therein) a restriction in the capillary chamber to about 0.001 to about 0.006 inch in height above substrate film therein would produce a reliable and adequate seal in the capillary when water-expandable polymer expands therein, i.e., in about 10 to about 15 seconds or about 25 seconds from the time of first aqueous contact, to inhibit flow of the aqueous medium therein. According to certain more preferred embodiments, when the dimension of the capillary is about 0.012 inch in height above substrate film therein, the restricted or second chamber portion of reduced capillary dimension is about 0.003 to about 0.004 inch in height above substrate film therein.

In the sealing device and method of certain embodiments the present invention, as exemplified by FIG. 2, the means for passing an aqueous medium from sample intake port 16 through first capillary chamber 34 to second capillary chamber 36 is generally by capillary action as well-defined in the art. However, the invention is not limited to any particular means for passing an aqueous medium from the sample intake port through the capillary chamber and could include gravity, pressure, vacuum or wicking means and the like. As the aqueous medium travels or advances through the capillary chamber, upon reaching the restricted or second chamber portion, the aqueous medium contacts the water-expandable polymer, and the water-expandable polymer begins to expand immediately and continues expansion to fill and seal at least a portion of the restricted or second chamber portion, and according to certain embodiments, preferably in a sufficient amount of time to prevent additional flow of aqueous medium in the capillary after the capillary has been filled with aqueous medium. According to certain preferred embodiments, this occurs in about 25 seconds or less, and in further preferred embodiments, in about 10 seconds or less.

Figure 3:
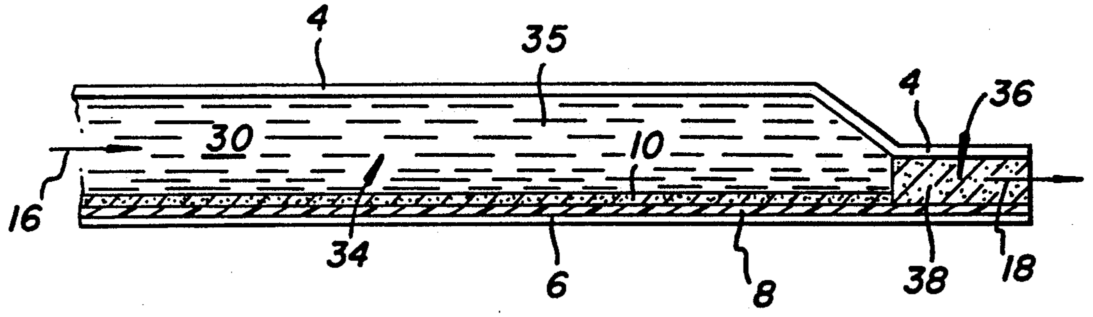
FIG. 3 is a cross-sectional, longitudinal view of a capillary sealing device according to certain embodiments of the present invention in the sealed configuration.

As shown in FIG. 3, aqueous medium 35 passes into and through capillary chamber 34 and water-expandable polymer sealing means 38 (shown in un-expanded form as 32 in FIG. 2) has expanded, preferably within about 10 to about 15 seconds from the time it is first contacted with the aqueous medium. As shown in FIG. 3, the water-expandable polymer has expanded into restricted or second capillary chamber 36 to seal the exit of air, gas and/or liquid medium through exhaust port 18.

In accordance with the present invention, the water-expandable polymer may be included or deposited by any suitable means in the restricted or second chamber portion. According to certain embodiments, the polymer is dissolved or suspended in an aqueous or other solvent medium and dried to form a dehydrated form of the polymer which, upon contact with moisture or water, re-hydrates and expands. As shown in FIG. 4, which represents capillary 40 having an alternative configuration wherein both top capillary wall 4 and bottom capillary wall 6 are molded or otherwise configured to form the restricted or second capillary portion, water-expandable polymer 32 is directly deposited on the inner capillary wall 6 and dried in place.

In certain preferred embodiments, as shown in FIGS. 2, 3 and 5, the water-expandable polymer sealing means 32 (38 in FIG. 3) is deposited on a polymer film 8. The particular polymer film is not critical as long as it provides an adequate substrate for the water-expandable polymer For example, polymer film 8 may be a photographic-type film or a polyester-based film, such as, polyethylene terephthalate.

In certain preferred embodiments, polymer film 8 extends substantially from sample intake port 16 to air exhaust port 18, and it may be inserted in the capillary after coating(s) are deposited thereon. In certain other preferred embodiments, an analytical reagent 10, for example, an analytical reagent for medical diagnostics, is coated on polymer film 8 and the reagent extends substantially from sample intake port 16 to water-expandable polymer 32 in such a manner that analytical reagent 10 is located in first capillary chamber 34. In these embodiments, the substrate film 8 can be coated with water-expandable polymer 32 or 38 and with analytical reagent 10 prior to placing the film in the capillary device. Naturally, it is within the purview of one skilled in the art to deposit analytical reagent 10 in the capillary device without using a substrate film, for example, as shown in FIG. 4.

The aqueous medium used in the process of the present invention can be any aqueous medium such as a biological fluid, a substituent of which is detectable by an analytical reagent as well known in the art. Such biological fluids and analytical reagents, for example, for medical diagnostics, according to certain preferred embodiments, are illustrated in the references discussed above and incorporated by reference herein. Non-limiting examples of aqueous media include such biological fluids as serum, plasma, saliva, tear, urine, cerebrospinal fluid and the like.

The following specific examples describe the device and method of this invention according to certain embodiments. They are intended for illustrative purposes only and should not be construed as limiting the present invention.

Unless otherwise specified, all parts and percentages are by weight.

EXAMPLE 1

An aqueous solution of 1.0% by w/v of carboxymethyl cellulose (Aqualon-7HFPH), i.e., 0.01 gram of solid carboxymethyl cellulose/1 ml. of water, was applied to a polyethylene terephthalate film base in a continuous strip about 0.25 inch (0.64 cm.) wide on the surface of the film adjacent an edge thereof. After the application of two coatings, the coated strip had a wet thickness of 0.020 inch (0.05 cm.). The film was dried in place. The film was then cut across the strip width into sections having a width corresponding to the width of the capillary, i.e., about 0.025 inch (0.063 cm.) for Example 1, each section created by the cutting having the 0.25 inch carboxymethyl cellulose coating on the surface (the previous width of the coating on the strip before cutting). The coated polyester film base was then placed in a rectangular (in height and width) plastic capillary device having a reduced capillary height molded into one end such that the carboxymethyl cellulose coated film base, was located in the region of the capillary having reduced capillary height, referred to herein as the "reduced finger area". The coated polyester film extended 0.18 inch (0.46 cm.) from the one end having reduced capillary height into the reduced finger area. The coating, carboxymethyl cellulose, placed in the "reduced finger area" of the capillary, is referred to herein as the "swelling layer." The dried swelling layer had a thickness of less than 0.001 inch (0.025 mm.). The thickness of the polyethylene terephthalate film was 0.004 inch (0.010 mm.).

The capillary device used herein, shown generally in FIG. 2, had a rectangular cross section substantially as shown in the perspective view of FIG. 5 and in the non-reduced portion was about 0.012 inch (0.030 cm.) in height above the dry coated film and 1.9 inches (4.82 cm.) in length and wide enough to accommodate the coated film strip, i.e., about 0.025 inch (0.063 cm.). One end of the capillary tube was restricted, i.e., reduced in height such that it was about 0.003–0.004 inch (0.008–0.010 cm.) in height above the dry, coated film. This restricted end of the tube is the reduced finger area and extended about 0.035–0.040 inch (0.09–0.10 cm.) in a longitudinal direction.

When the swelling layer was contacted with a biological fluid or water, it became rehydrated and closed off the gap between the reduced capillary area and the polyester film base. This closure occurred within 10 seconds when the capillary was filled with serum, and in less than 10 seconds when the capillary was filled with water.

EXAMPLE 2

The capillary height in the reduced height area was changed from about 0.003–0.004 inch above the dry, coated film (0.008–0.010 cm.) to about 0.002 inch above the dry, coated film (0.005 cm.), and the same coating and method were used in the reduced finger area as in Example 1. The characteristics of this device were indistinguishable from the characteristics of the device of Example 1, i.e., the coating swelled in the reduced finger area to form a plug and closed the capillary within approximately ten seconds from the time that the sample contacted the coating material, and the plug in the reduced finger area held against a pressure of about 5 p.s.i.

EXAMPLE 3

The capillary height in the reduced height area was increased from about 0.003–0.004 inch (0.008–0.010 cm.) above the dry, coated film to about 0.006 inch (0.015 cm.) above the dry, coated film, and the coating used in Example 1 was applied to the film base. When this coated base was used in the reduced finger area, the coating swelled, and the capillary was closed (sealed) in approximately 15 seconds when plasma was used as a fluid in the capillary device. This closure prevented further movement of plasma solution as determined by visual inspection.

EXAMPLE 4

A 15% w/v gelatin solution was substituted for the 1% w/v carboxymethyl cellulose solution of Example 1, and the polyethylene terephthalate film base was coated to a wet thickness of about 20 mils (0.050 cm.). This gelatin strip on the polyethylene terephthalate film base was placed in a reduced capillary area having a height of approximately 0.025 to 0.003 inch (0.064 to 0.008 cm.) above the dry, coated film. The gelatin swelled sufficiently to close off the capillary in approximately 20–30 seconds. A substantially identical gelatin layer was not capable of preventing flow within the capillary when incorporated into the end of an unrestricted capillary with a height of about 0.010 to 0.015 inch (0.025 to 0.038 cm.) above the dry, coated film, similar to the one shown in FIG. 1A.

EXAMPLE 5

A solution containing 1.5% w/v sodium alginate of medium viscosity (supplied by Sigma Chemicals Company, St. Louis, Mo.) was substituted for the 1% w/v carboxymethyl cellulose solution described in Example 1. The results using the substrate coated from the sodium alginate solution in a device as described in Example 1 demonstrated that a plug formed from the sodium alginate. However, the swelling of the material and the formation of the plug was slower than the carboxymethyl cellulose material of Examples 1–4.

EXAMPLE 6

Comparative Example

Figure 1A:
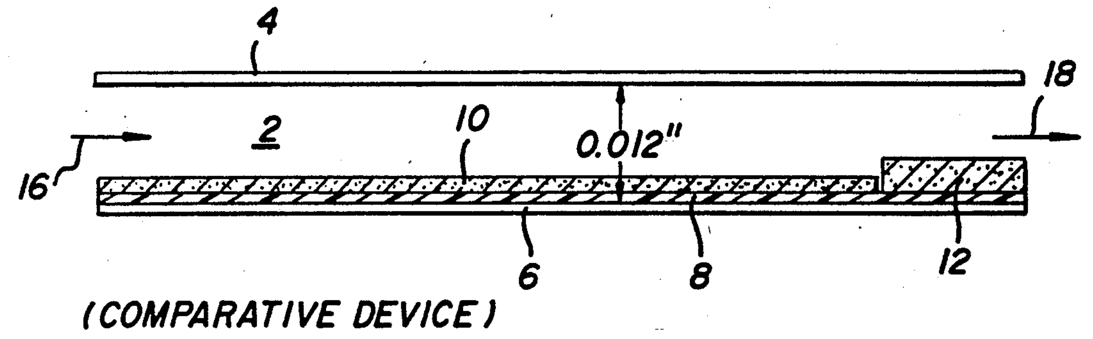
FIG. 1A is a cross-sectional, longitudinal view of a capillary sealing device illustrated for comparative purposes and is not in accordance with the present invention.
Figure 1B:
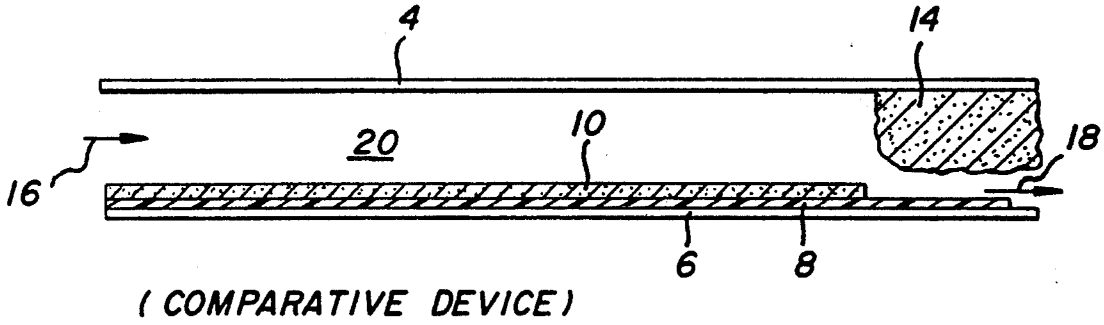
FIG. 1B is a cross-sectional, longitudinal view of an alternative capillary sealing device illustrated for comparative purposes and is not in accordance with the present invention.

The capillary device of FIG. 2 of rectangular plastic construction was compared with capillary devices substantially as illustrated in FIGS. 1A and 1B. The capillary devices of FIGS. 1A and 1B were unmodified (unrestricted) rectangular plastic capillary devices and did not have the reduced capillary height ("reduced finger area") in the end wall of the capillary device as in the capillary device of FIG. 2. The capillary devices of FIGS. 1A and 1B were 0.012 inch high from the top of the wall to the coated film, 0.035 inch wide and 2.250 inches long.

In the device of FIG. 1A, capillary device 2 has a top capillary wall 4 and a bottom capillary wall 6. The side walls of capillary device 2 are not shown in the illustration but form a rectangular capillary channel in the device as in FIGS. 2 and 5.

A coated strip was prepared as described in Example 1 wherein a carboxymethyl cellulose swelling layer 12 was placed on a polyethylene terephthalate substrate film 8 substantially as shown in FIG. 1A, and the remainder of the film was coated with a reagent coating 10 of ferricyanide in polyvinyl alcohol. Film 8, having a thickness of 0.004 inch and having a dried swelling layer 12 coated at a dry thickness of 0.001 inch, was placed inside capillary device 2 on bottom capillary wall 6. The height of the capillary, i.e., from top capillary wall to the coated film substrate (inside measurements) was about 0.012 inch (0.030 cm.).

In FIG. 1B, capillary device 20 was identical to capillary device 2 of FIG. 1A having top capillary wall 4 and bottom capillary wall 6. Side capillary walls are not shown in this longitudinal cross-sectional illustration. A reagent coating 10 of ferricyanide in polyvinyl alcohol was applied to substrate film 8 of polyethylene terephthalate having a film thickness of 0.004 inch and dried as was done with the device shown in FIG. 1A. However, as shown in FIG. 1B, swelling layer 12 was omitted from the end portion of substrate film 8. As shown in FIG. 1B, a quantity of swelling layer material measuring 0.180 inch in length, 0.35 inch in width and about 0.012 inch in height, defined herein as plug 14, was placed directly on the top capillary wall 4 at the end of the capillary tube 20.

Swelling layer 12 in capillary device 2 of FIG. 1A and plug 14 of swelling material in capillary device 20 of FIG. 1B were tested to determine if they would be able to close off the end of the unrestricted capillary, thereby preventing flow of liquid and air from the end of the capillary device when a liquid material contacted the swelling layer 12 or plug 14 of swelling material, causing the material to expand.

Solutions of gelatin, alginate, carboxymethyl cellulose, cellulose, combinations of cellulose and carboxymethyl cellulose and combinations of alginate and gelatin were prepared. Each of these solutions was used separately as the swelling material for the plug 14, which was placed at the end of capillary device 20 as shown in FIG. 1B.

When dried, the plugs 14 left gaps permitting air to pass out of the capillary at air exhaust port 18 at the end of the capillary device as aqueous sample entered the capillary from the opposite end at sample inlet port 16. When the aqueous sample entering the capillary device from sample inlet port 16 contacted the plug 14, each of the materials tested swelled and formed a dense gel.

Although in certain instances, the plug 14 swelled sufficiently to oppose any further flow of liquid and air in the capillary by blocking or plugging air exhaust port 18, the capillary device as shown in FIG. 1B was unreliable because it did not close off the air flow in the capillary rapidly enough to prevent movement of the gradient chemicals which were a part of the reagent coating 10. Furthermore, the manufacturing processes for making the capillary device having plug 14 as in FIG. 1B were unreliable because of the amount of plug material required to reproducibly form a seal. It was observed that when enough plug material 14 was placed in the device of FIG. 1B to enable it to seal, in several cases, there was insufficient passage of air through the capillary to permit the filling of the capillary with sample. When an amount of plug material was used to permit sufficient passage of air through the capillary, it was observed in several cases that there was insufficient material to form a plug.

The expansion of plug 14 across the distance (height) of the capillary device did not occur rapidly enough to enable the capillary to seal uniformly at air exhaust port or end 18 of capillary device 10 of FIG. 1B. As used in this example, sealing uniformly and rapidly enough differ in that sealing uniformly defines whether or not a seal is formed, and sealing rapidly enough defines the movement of liquid under the plug. Formation of a seal or plug in greater than about 25 seconds is inadequate because a substantial amount of the sample would flow out of the capillary.

When comparable tests with carboxymethylcellulose expandable polymer were run on the capillary device in FIG. 2, it was shown that the device reliably and uniformly closed in a shorter period of time, for example, normally less than 15 seconds, more normally less than 10 seconds and generally even more normally in about 5 seconds, by the swelling of the expandable material placed on the substrate film. When serum or plasma dyed with red food coloring was used as the sample, it was found that only a trace amount of the red food coloring could be found in the region distal to the end of the capillary closed by the swelling layer. The swelling layer was found to have expanded (swelled) and trapped the rest of the liquid, even if the capillary was filled at a down angle of as much as 20°.

It was visually found that turbulent flow in the capillary device was completely inhibited once the capillary was sealed after 5 seconds by the expandable material used in the swelling layer. When a colloidal material, activated charcoal suspended in a solution of polyvinyl alcohol, was dissolved in the serum or plasma and added to the capillary, once the expandable material in a device as shown in FIG. 2 had closed the air exhaust port or end of the capillary, the capillary was examined microscopically. It was found that the colloidal material was stationary in the capillary and not subject to movement due to liquid flow.

In another test to prove that flow of material was inhibited in the capillary device incorporating the swelling layer in accordance with the present invention, the precision of three different capillary devices was compared, namely, (1) a device which had not been plugged, (2) a device similar to the one shown in FIG. 1B which had been plugged in a method which required an agent, water expandable carboxymethyl cellulose, to swell across a span of 0.012 inch above the dry film of the capillary device, and (3) a device having a swelling layer in the reduced finger area in accordance with the present invention identical in dimensions and materials to the device in Example 1 and FIG. 2. The results of this comparison are shown in the table below.

TABLE

Comparison of Device Precision with Plugging Method

| Method/Device | Correlation Variation (CV) |
|---|---|
| No plug | 12-14% |
| Plug as depicted in FIG. 1B | 6-7% |
| Swelling layer of FIG. 2, Example 1. | 2-3% |

Devices which were not plugged, are subject to very wide amounts of error with correlation variation ranging up to 12% to 14%. The correlation variation in the devices plugged as shown in FIG. 1B was 6% to 7%. Devices plugged (sealed) by the method of the present invention have correlation variation in the range of 2% to 3%. These data demonstrate the improvement of the present invention, and illustrate the advantages when flow inside the filled capillary is substantially reduced to within acceptable limits.

It will be apparent to those skilled in the art that various modifications and variations can be made in the capillary device and method of the present invention without departing from the scope or spirit of the invention. As an example, capillary tubes having circular, rectangular or square cross sections or any other cross-sectional configuration, can be used according to the present invention. Furthermore, the capillary devices and methods according to the present invention can be adapted for use with any tube, chamber, channel or capillary based diagnostic measuring device wherein once the capillary is filled, it is exceedingly important that further movement of the fluid be prevented.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A sealable chamber device comprising a hollow chamber having a sample intake port at a first end and an exhaust port at a second end, said hollow chamber having walls forming a first chamber portion starting at said intake port, and a reduced chamber portion having walls forming a cross-sectional area less than said first chamber portion from said exhaust port to said first chamber portion and a sufficient amount of aqueous expandable polymer in said reduced chamber portion which forms a seal in said reduced chamber portion upon contact of the polymer with an aqueous medium.

2. A sealable chamber device according to claim 1, wherein said chamber walls form a circular cross section.

3. A sealable chamber device according to claim 1, wherein said chamber walls form a rectangular cross section

4. A sealable chamber device according to claim 1, wherein said chamber walls form a square cross section.

5. A sealable chamber device according to claim 1, wherein the cross-sectional area formed by the walls of said reduced chamber portion is about 50% to about 92% less than the cross-sectional area formed by the walls of said first chamber portion.

6. A sealable chamber device according to claim 1, wherein the cross-sectional area formed by the walls of said reduced chamber portion is about 67% to about 75% less than the cross-sectional area formed by the walls of said first chamber portion.

7. A sealable chamber device according to claim 1, wherein the aqueous expandable polymer in said reduced chamber portion is on a polymer film and said polymer film extends from the sample intake port to the exhaust port.

8. A sealable chamber device according to claim 1, wherein a medical diagnostic reagent is coated on a portion of polymer film in the first chamber portion.

9. A sealable chamber device according to claim 1, wherein the aqueous expandable polymer is hydrophilic.

10. A sealable chamber device according to claim 9, wherein the aqueous expandable hydrophilic polymer is selected from the group consisting of carboxymethyl cellulose, alginate, gelatin, cellulose, alginate/gelatin mixture and cellulose/carboxymethyl cellulose mixture.

11. A sealable chamber device according to claim 1, wherein said hollow chamber is a capillary.

12. A flow measuring device comprising a first chamber having walls forming a sample intake port at one end and a second chamber having walls forming a reduced cross-sectional area contiguous with and at the other end of said first chamber, said second chamber having walls forming an exhaust port contiguous with said second chamber and disposed opposite said sample intake port; an analytical reagent for medical diagnostics disposed in said first chamber; a water-expandable polymer sealing means disposed in said second chamber; means for passing an aqueous medium from said sample intake port through said first chamber to said second chamber; and means for contacting the water-expandable polymer sealing means with an aqueous medium, thereby causing the polymer to expand and form a seal in said second chamber.

13. A flow measuring device according to claim 12, wherein the water-expandable polymer sealing means is deposited in said second chamber in an amount sufficient to form a seal in said second chamber when contacted with the aqueous medium, thereby inhibiting passage from said exhaust port and inhibiting the flow of aqueous medium in contact with analytical reagent in said first chamber.

14. A flow measuring device according to claim 12, wherein the water-expandable polymer sealing means in said second chamber is on a polymer film and said polymer film extends from the sample intake port, through said first and second chambers to said exhaust port.

15. A flow measuring device according to claim 12, wherein the analytical reagent for medical diagnostics is coated on a polymer film in said first chamber and extends from said sample intake port to said second chamber.

16. A flow measuring device according to claim 12, wherein the water-expandable polymer sealing means in said second chamber is coated on a polymer film and said polymer film extends from said sample intake port to said exhaust port, said polymer film having an analytical reagent for medical diagnostics coated thereon in that portion of said polymer film extending through said first chamber.

17. A flow measuring device according to claim 12, wherein the water-expandable polymer is hydrophilic.

18. A flow measuring device according to claim 17, wherein the water-expandable hydrophilic polymer sealing means is a polymer selected from the group consisting of carboxymethyl cellulose, alginate, gelatin, cellulose, alginate/gelatin mixture and cellulose/carboxymethyl cellulose mixture.

19. A flow measuring device according to claim 12, wherein the reduced cross-sectional area formed by the walls of said second chamber is about 50% to about 92% less than the cross-sectional area formed by the walls of the first chamber.

20. A flow measuring device according to claim 12, wherein the reduced cross-sectional area formed by the walls of said second chamber is about 67% to about 75% less than the cross-sectional area formed by the walls of said first chamber.

21. A flow measuring device according to claim 12, wherein said first chamber is a capillary.

22. A method for inhibiting the flow of an aqueous medium in a channel having a sample intake port at one end and an exhaust port at the other end, comprising:

a providing a channel having walls forming a reduced size in the channel at or proximal the exhaust port end of said channel; and b. adding a sufficient amount of water-expandable hydrophilic polymer to that portion of the channel having a reduced size, to inhibit flow through said exhaust port upon contact of the polymer with an aqueous medium.

23. A method for inhibiting the flow of an aqueous medium in a channel in accordance with claim 22, further comprising c. passing an aqueous medium from said sample intake port to said exhaust port; and d. contacting the water-expandable polymer with the aqueous medium, thereby causing the polymer to expand and inhibit flow through the exhaust port.

24. A method for inhibiting the flow of an aqueous medium in a channel in accordance with claim 22, further comprising adding an analytical reagent for medical diagnostics to said channel.

25. A method for inhibiting the flow of an aqueous medium in a channel in accordance with claim 22, further comprising adding an analytical reagent for medical diagnostics to that portion of the channel extending from the exhaust port to that portion of the channel having a reduced size; passing an aqueous medium from said sample intake port to said exhaust port; and contacting the water-expandable polymer with the aqueous medium, thereby causing the polymer to expand and inhibit flow through the exhaust port.

26. A method for inhibiting the flow of an aqueous medium in a channel in accordance with claim 24, wherein the aqueous medium is a biological fluid, a substituent of which is detectable by said analytical reagent.

27. A method for inhibiting the flow of an aqueous medium in a channel in accordance with claim 24, wherein the analytical reagent and the water-expandable polymer are coated on a film substrate and placed in said channel.

28. A method for inhibiting the flow of an aqueous medium in a channel in accordance with claim 25, wherein the analytical reagent and the water-expandable polymer are coated on a polymer film and placed in said channel.

29. A method for inhibiting the flow of an aqueous medium in a channel in accordance with claim 22, wherein the water-expandable polymer is hydrophilic.

30. A method for inhibiting the flow of an aqueous medium in a channel in accordance with claim 29, wherein the water-expandable hydrophilic polymer is selected from the group consisting of carboxymethyl cellulose, alginate, gelatin, cellulose, alginate/gelatin mixture and cellulose/carboxymethyl cellulose mixture.

31. A method for inhibiting the flow of an aqueous medium in a channel in accordance with claim 23, wherein the water-expandable polymer is hydrophilic.

32. A method for inhibiting the flow of an aqueous medium in a channel in accordance with claim 31, wherein the water-expandable hydrophilic polymer is selected from the group consisting of carboxymethyl cellulose, alginate, gelatin, cellulose, alginate/gelatin mixture and cellulose/carboxymethyl cellulose mixture.

33. A method for inhibiting the flow of an aqueous medium in a channel in accordance with claim 22, wherein the channel is a capillary.

* * * * *